United States Patent [19]
Davis

[11] Patent Number: 5,640,373
[45] Date of Patent: Jun. 17, 1997

[54] SECURE TIME KEEPING PERIPHERAL DEVICE FOR USE IN LOW-POWER APPLICATIONS

[75] Inventor: Timothy Don Davis, Arlington, Tex.

[73] Assignee: National Semiconductor Corporation, Santa Clara, Calif.

[21] Appl. No.: 518,966

[22] Filed: Aug. 24, 1995

[51] Int. Cl.$^6$ ............... G04C 13/08; G06F 1/04; G06F 1/18
[52] U.S. Cl. ........................... 368/156; 364/271
[58] Field of Search ................. 368/10, 155, 156, 368/200, 202; 364/242.21, 270, 271, 271.1; 395/550

[56] References Cited

U.S. PATENT DOCUMENTS

| | | | |
|---|---|---|---|
| 3,999,169 | 12/1976 | Perschy | 340/172.5 |
| 4,708,491 | 11/1987 | Luitje | 368/156 |
| 5,274,545 | 12/1993 | Allan et al. | 368/156 |
| 5,416,435 | 5/1995 | Jokinen | 327/113 |
| 5,546,363 | 8/1996 | Funaki et al. | 368/200 |

*Primary Examiner*—Vit W. Miska
*Attorney, Agent, or Firm*—Limbach & Limbach L.L.P.

[57] ABSTRACT

A secure time keeping peripheral device is for synchronizing a time reference clock signal to a system clock signal and is especially suited for use in low-power processor applications. Time reference circuitry adjusts a time reference counter held therein responsive to transitions of the time reference clock signal. At least one system time register is connected to the time reference circuitry to receive the time reference counter responsive to transitions of a synchronizing signal. Synchronizing signal generating circuitry is connected to receive the system clock signal and to provide the synchronizing signal, synchronous to the system clock signal, when an externally provided enable signal is asserted to the synchronizing signal generating circuitry. Since the system time register circuitry is only sampled when the externally provided enable signal is asserted (e.g., when the processor needs to determine the value of the "real time clock"), power consumption by the secure time keeping device is greatly reduced relative to power consumption of conventional secure time keeping devices.

4 Claims, 2 Drawing Sheets

SECURE TIME KEEPING PERIPHERAL DEVICE FOR USE IN LOW-POWER APPLICATIONS

TECHNICAL FIELD OF THE INVENTION

The present invention relates to secure time keeping peripheral devices, and in particular, to a secure time keeping peripheral device that synchronizes a system clock signal to a timekeeping clock signal only when access to a synchronized system clock signal is required.

BACKGROUND OF THE INVENTION

A first conventional time keeping device 100 for maintaining a processor's "real time clock" is illustrated in block form in FIG. 1. Real time clock values are typically used by computer-implemented processes for scheduling tasks and for time tagging sent or received data. Referring to FIG. 1, a counter time register 104 of time keeping device 100 has a clock input to receive a time reference clock signal CLKR. The value held in the counter time register 104 is adjusted at a frequency equal to the frequency of the time reference clock signal CLKR. For example, a 32,768 Hz crystal oscillator reference 106 is often utilized to generated the time reference clock signal CLKR. In this case, the time value held in the counter time register 104 would be incremented at 32,768 Hz.

Bus decoding logic 114 determines from control signals BUS_CNTL present on a system bus 108 when the time keeping peripheral device 100 is being accessed (e.g., by memory-mapped access) by a processor 110. In response, a time keeping request signal TIME_ADR is asserted. Gated clock generation circuitry 111 uses the time keeping request signal TIME_ADR and a system clock signal CLKS to generate a "gated" system clock signal CLKS_G. The gated system clock signal CLKS_G is provided to an enable input EN of bus interface circuitry 112. When the gated system clock signal CLKS_G is asserted, the bus interface circuitry 112 responds by providing the value held in the counter time register 104 (or a portion of the value) as a real time clock value to the processor 110 via the system bus 108.

The frequency of the system clock signal CLKS is typically at least one order of magnitude greater than the frequency of the time reference clock signal CLKR. It can be seen that the decoding logic 114, the gated clock generation circuitry 111, and the bus interface circuitry 112 serve to synchronize the system clock signal CLKS to the time keeping clock signal CLKR.

However, a problem with the conventional time keeping device 200 is that an attacker, by driving the crystal oscillator reference 106 in an abnormal or unexpected manner, may be able to disarm security features of the processor 110 that are implemented in software and/or firmware which the processor 110 is executing. That is, by causing erroneous real time clock values to be provided to the processor 110, the processor security routines may become corrupted or confused.

A conventional secure time keeping device 200, illustrated in block form in FIG. 2, addresses these security issues with one or more system time registers 218, where each additional system time register 218 provides an additional level of security. (Where the components are the same as those of the other figures, they are given the same reference designations. For example, the counter time register 104 shown in FIG. 1 is identical to the counter time register 104 shown in FIG. 2.) In particular, the system time registers 218 operate by latching the value held in the counter time register 104 responsive to edges of the system clock signal CLKS. By contrast, the bus interface circuitry 112 operates responsive to the gated system clock signal CLKS_G. The conventional secure time keeping device 200 is susceptible to passing on invalid clock values only during the relatively short period of a system clock signal CLKS edge, thus narrowing the window during which invalid clock values may be sampled, even if the time keeping clock signal CLKR is driven in an unstable manner.

While the system time registers 218 address the security problem, a disadvantage of including the system time registers 218 is that they consume power at all times, even when the processor 110 does not require a real time clock value. Thus, what is desired is a secure time keeping device which is operable with relatively low power consumption.

SUMMARY OF THE INVENTION

The present invention is a secure time keeping peripheral device, for synchronizing a time reference clock signal to a system clock signal, for use especially in low-power processor applications. Time reference circuitry adjusts a time reference counter held therein responsive to transitions of the time reference clock signal. At least one system time register is connected to the time reference circuitry to receive the time reference counter responsive to transitions of a synchronizing signal. Synchronizing signal generating circuitry is connected to receive the system clock signal and to provide the synchronizing signal, synchronous to the system clock signal, when an externally provided enable signal is asserted to the synchronizing signal generating circuitry.

Since the system time register circuitry is only sampled when the externally provided enable signal is asserted (e.g., when the processor needs to determine the value of the "reap time clock"), power consumption by the secure time keeping device is greatly reduced relative to power consumption of conventional secure time keeping devices.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
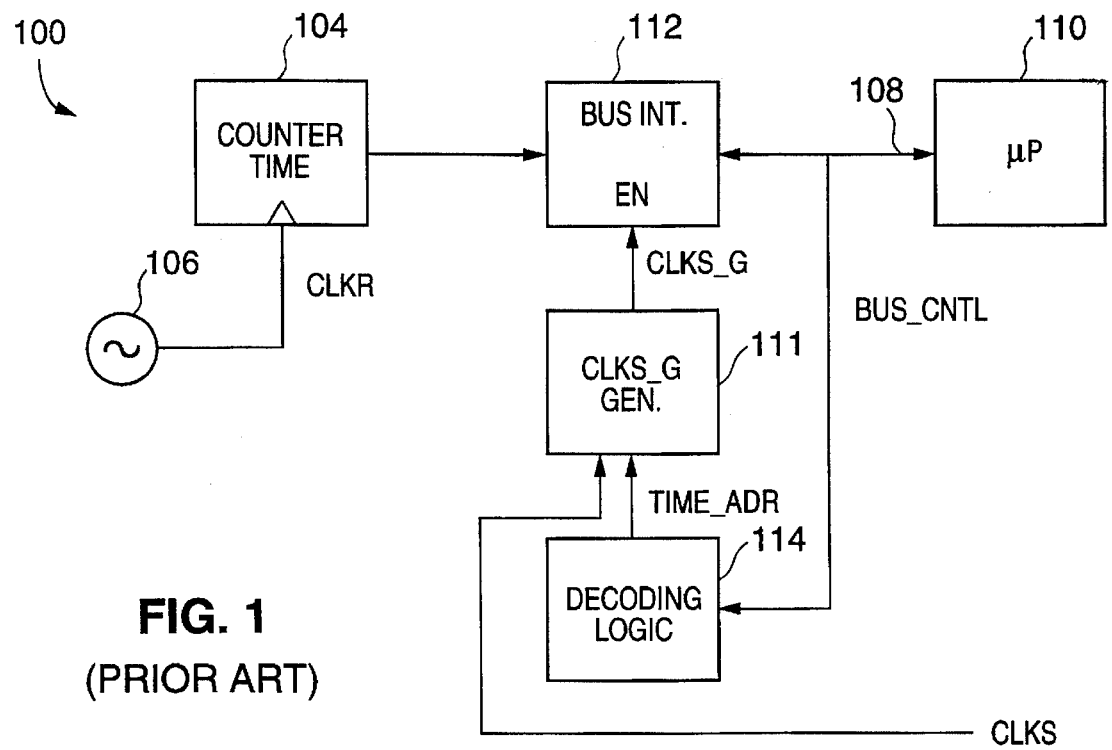
FIG. 1 illustrates, in block form, a conventional time keeping peripheral device.
Figure 2:
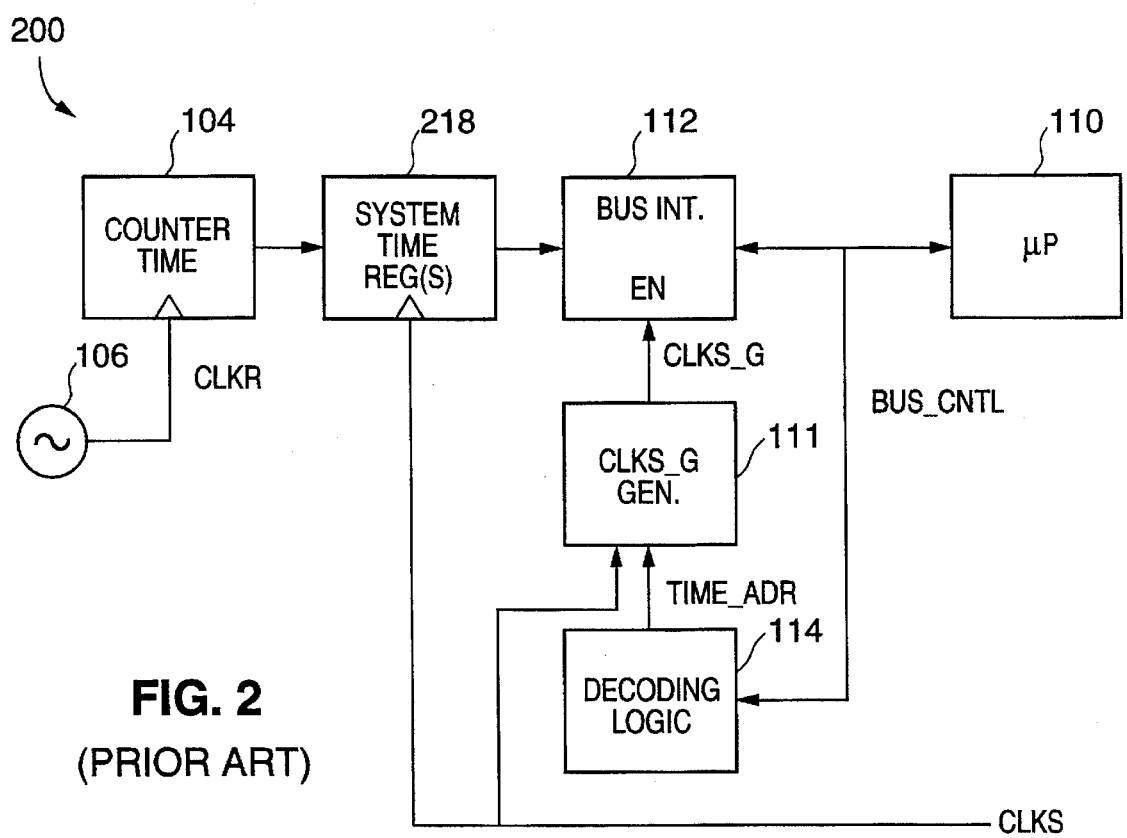
FIG. 2 illustrates, in block form, a conventional secure time keeping peripheral device.
Figure 3:
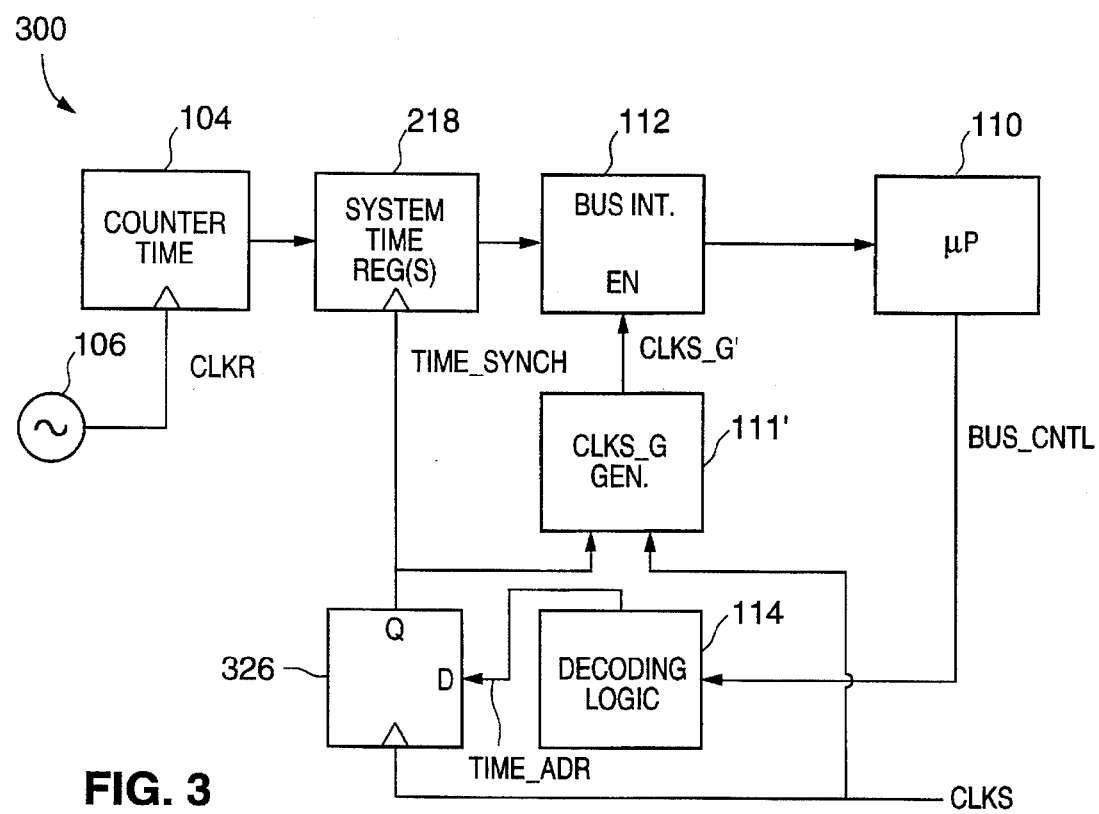
FIG. 3 illustrates, in block form, a secure time keeping peripheral device, especially for use in low-power applications, in accordance with one embodiment of the present invention.

A time keeping peripheral device 300 in accordance with one embodiment of the present invention is illustrated in FIG. 3. (Where the components are the same as those of the other figures, they are given the same reference designations.) The time keeping peripheral device 300 generally includes the same components as the conventional time keeping peripheral device 200, except that additional circuitry is provided to lower power consumption.

In particular, the system time registers 218 latch the value held in the time counter register 104 responsive to an edge of a synchronizing signal TIME_SYNCH rather than to an edge of the system clock signal CLKS. The synchronizing signal TIME_SYNCH is provided by synchronizing signal generating circuitry 326 (shown in FIG. 3 as flip-flop 326) responsive to the rising edges of the system clock signal CLKS when the time keeping peripheral device 300 is being accessed by the processor 110 (as indicated by TIME_ADR being asserted by decoding logic 114 responsive to control signals BUS_CNTL). TIME_ADR is preferably synchronous to the system clock signal CLKS such that glitches in the synchronizing signal 322 are avoided. Gated clock generation circuitry 111' uses the synchronizing signal TIME_SYNCH and the system clock signal CLKS to generate a gated system clock signal CLKS_G'. Bus interface circuitry 112 responds to the gated system clock signal CLKS_G' being asserted by providing the value held in the counter time register 104 (or a portion of the value) as a real time clock value to the processor 110 via the system bus 108. The timing of the gated clock signal clock CLKS_G' relative to the other signals received by, and generated within, the time keeping device 100, are discussed below with reference to FIG. 4.

Figure 4:
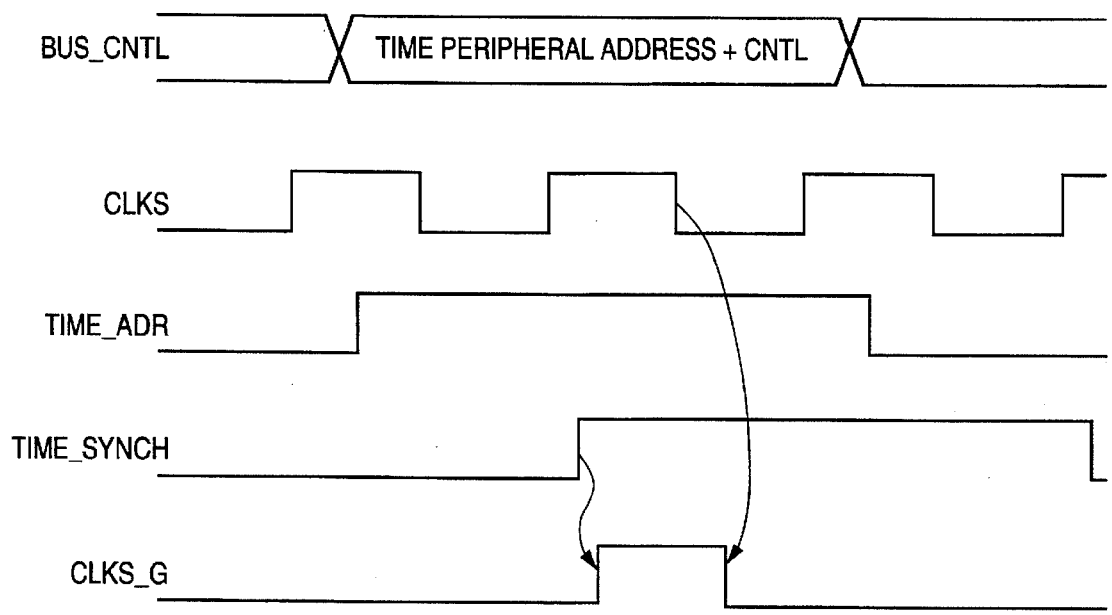
FIG. 4 is a timing diagram that illustrates the operation of the secure time keeping device of FIG. 3.

FIG. 4 is a timing diagram that illustrates the operation of the time keeping peripheral device 300. First, referring to FIG. 4, it can be seen that the time keeping request signal TIME_ADR provided to the D input of flip-flop 326 is asserted by decoding logic 114 whenever the control signals BUS_CNTL indicate that the time keeping peripheral device is being addressed. TIME_SYNCH is asserted by flip-flop 326 responsive to the next rising edge of the system clock signal CLKS after TIME_ADR is asserted. The counter time register 104 value is latched into the system time register 218 responsive to the rising edge of TIME_SYNCH. After TIME_ADR is deasserted, TIME_SYNCH is deasserted responsive to the next rising edge of the system clock signal CLKS. As shown in FIG. 4, the bus control signals BUS_CNTL, and thus TIME_ADR, are synchronized to CLKS.

The bus interface circuitry 112 is enabled to present the latched counter time value from the system time register 218 responsive to CLKS_G' being asserted by gated clock generation circuitry 111'. The gated clock generation circuitry 111' may assert CLKS_G' anytime after the counter time value is latched into the system time register 218. For example, FIG. 4 shows that the gated system clock signal CLKS_G' is asserted responsive to the rising edge of TIME_SYNCH and is deasserted responsive to the next falling edge of the system clock CLKS. Alternately, CLKS_G' could be deasserted responsive to the next rising edge of the system clock CLKS.

In this manner, the system time register 218 is only sampled when the processor needs to determine the value of the "real time clock" and, thus, power consumption by the time keeping device is greatly reduced.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A time keeping peripheral device, especially for use in low-power applications, for synchronizing a system clock signal to a time reference clock signal, the device comprising:

time reference counter value holding circuitry that holds a time reference counter value, wherein the time reference counter value holding circuitry includes means for adjusting the time reference counter value held responsive to transitions of the time reference clock signal;

at least one system time register that receives the time reference counter value, from the time reference counter value holding circuitry, responsive to transitions of a synchronizing signal; and synchronizing signal generating circuitry connected to receive the system clock signal and to provide the synchronizing signal, synchronous to the system clock signal, when an externally provided enable signal is asserted to the synchronizing signal generating circuitry.

2. The time keeping peripheral device of claim 1 and further comprising a bus interface, wherein the bus interface receives the time reference counter value from the at least one system time register and provides the time reference counter value to an external bus.

3. The time keeping peripheral device of claim 1, wherein the at least one system time register includes a latch connected to receive the time reference counter value, from the time reference counter value holding circuitry, at a data input of the latch and that latches the time reference counter value responsive to the synchronizing signal.

4. The time keeping peripheral device of claim 1, where the synchronizing signal generating circuitry includes flip-flop circuitry that receives the externally provided enable signal at a data input of the flip-flop circuitry and that provides the synchronizing signal at a level the same as the externally provided enable signal to a data output of the flip-flop circuitry in response to transitions of the system clock signal.

* * * * *